United States Patent
Fast et al.

(10) Patent No.: US 11,598,473 B2
(45) Date of Patent: Mar. 7, 2023

(54) INVERSION LINER ASSIST ADAPTER

(71) Applicant: Fast Pipe Lining, Inc., La Salle, IL (US)

(72) Inventors: Richard Andrew Fast, La Salle, IL (US); Christopher Mark Finnell, Earlville, IL (US)

(73) Assignee: Pipe Restoration LLC, East Aiken, SC (US)

( * ) Notice: Subject to any disclaimer, the term of this patent is extended or adjusted under 35 U.S.C. 154(b) by 0 days.

(21) Appl. No.: 17/241,189

(22) Filed: Apr. 27, 2021

(65) Prior Publication Data

US 2022/0341532 A1   Oct. 27, 2022

(51) Int. Cl.
*F16L 55/18* (2006.01)
*F16L 55/165* (2006.01)

(52) U.S. Cl.
CPC ........... *F16L 55/18* (2013.01); *F16L 55/1651* (2013.01)

(58) Field of Classification Search
CPC ....... F16L 55/1651; F16L 57/00; F16L 55/18; B29C 63/36; B29C 63/48; B29B 15/00
USPC ........... 138/98, 97; 405/184.1, 184.2, 150.1; 156/294, 94, 287; 425/11, 387.1, 13, 14; 264/36.17, 516
See application file for complete search history.

(56) References Cited

U.S. PATENT DOCUMENTS

| | | | |
|---|---|---|---|
| 4,385,885 A * | 5/1983 | Wood | B29C 63/36 264/516 |
| 4,668,125 A | 5/1987 | Long, Jr. | |
| 4,776,370 A | 10/1988 | Long, Jr. | |
| 5,358,359 A * | 10/1994 | Long, Jr. | F16L 55/18 405/184.2 |
| 5,374,174 A * | 12/1994 | Long, Jr. | B29C 63/36 405/184.2 |
| 5,906,789 A | 5/1999 | Kamiyama et al. | |
| 6,244,846 B1 * | 6/2001 | Keller | F16L 55/1651 264/516 |
| 6,364,991 B1 | 4/2002 | Rice | |
| 6,960,313 B2 * | 11/2005 | Waring | F16L 55/1651 264/516 |
| 7,398,797 B2 * | 7/2008 | Kamiyama | F16L 55/179 264/269 |
| 7,402,030 B2 * | 7/2008 | Kamiyama | F16L 55/1651 425/13 |

(Continued)

FOREIGN PATENT DOCUMENTS

| | | |
|---|---|---|
| CN | 112518017 A | 3/2021 |
| JP | 2007125701 A | 5/2007 |

(Continued)

*Primary Examiner* — Patrick F Brinson
(74) *Attorney, Agent, or Firm* — Nyemaster Goode, P.C.

(57) ABSTRACT

A cured-in-place pipe rehabilitation device launcher having a launcher assembly and a liner assist chamber, the launcher assembly includes a nozzle, an air feed chamber above the nozzle to pressurize a cured-in-place liner to aid in urging it into a pipe to be rehabilitated, and an attachment plate is disposed above the adapter. The liner assist chamber includes a base plate to attach to the attachment plate, a liner assist frame coupled to the base plate, a plurality of rollers rotationally attached to the liner assist frame, and a motor operably attached to at least one of the plurality of rollers and configured to aid in urging the cured-in-place liner into the pipe.

20 Claims, 12 Drawing Sheets

(56) References Cited

U.S. PATENT DOCUMENTS

| | | | |
|---|---|---|---|
| 7,476,348 B2* | 1/2009 | Waring | B29C 63/36 425/11 |
| 9,851,041 B2* | 12/2017 | Waring | B29C 63/36 |
| 10,190,719 B2* | 1/2019 | Waring | B29C 63/36 |
| 2006/0093436 A1 | 5/2006 | Gearhart | |
| 2006/0197262 A1* | 9/2006 | Waring | B29C 63/36 264/516 |
| 2007/0114689 A1* | 5/2007 | Driver | B29C 63/36 425/11 |
| 2007/0197262 A1* | 8/2007 | Smith | H04L 12/2803 455/562.1 |
| 2007/0240827 A1* | 10/2007 | Driver | F16L 55/1656 156/461 |
| 2016/0258566 A1* | 9/2016 | Waring | F16L 55/18 |
| 2018/0292040 A1 | 10/2018 | Homrighaus et al. | |
| 2021/0046693 A1 | 2/2021 | Hirtz et al. | |

FOREIGN PATENT DOCUMENTS

| | | |
|---|---|---|
| KR | 1020130034065 A | 4/2013 |
| KR | 101686548 B1 | 12/2016 |
| KR | 101846844 B1 | 5/2018 |
| WO | 2014081267 A1 | 5/2014 |

* cited by examiner

INVERSION LINER ASSIST ADAPTER

BACKGROUND

Prior methods for repairing damaged portions of pipelines include moving a liner tube impregnated with a liquid material capable of curing and hardening to a position within the pipe where the damaged portion is located. The liner tube is installed by pulling, pushing, or everting the liner into the host pipe. Once the liner is positioned within the host pipe, it is pressurized, usually by an inflation bladder, causing the liner to press against the interior wall of the host pipe, and the liner is cured by applying heat, such as steam or hot water. These liners can also be cured at ambient temperatures by chemical mixtures that generate an exothermic reaction, the use of ultraviolet light or other photocuring initiators, or by electron beam curing. The liner tube forms an interior liner in the pipe for the pipeline being repaired. These processes are known as cured-in-place pipe (CIPP) lining.

Though the CIPP can be pushed, pulled, or inverted (or everted) into and through the pipeline, the most prevalent method is inversion. This is where the liner tube is inverted turning over itself as the liner progresses from one access point to a predetermined second access point as described in ASTM F1216. The CIPP liner is inverted into the pipe by using a tower to suspend the liner, feed the liner into itself to turn back the liner on itself, secure the liner, and introduce water into the liner creating head pressure that causes the liner to invert down and into and through the pipeline. Compressed air is another method for causing the liner to invert and eliminates the need for a tower as the operator can select the necessary air pressure to completely invert the liner. However, this requires a pressure vessel to contain all of the liner.

Portable inverters that formed a seal around the plastic-coated surface of a resin saturated liner has become the most desired means for inverting a CIPP liner. However, the portable inverter does not provide controlled inversion of the liner as the water inversion or air inversion using a pressure vessel processes do. This is due to the erratic seal made around the liner as the surface of the liner is not consistent, and fluctuating friction occurs as the gasket presses against the liner and likewise the air pressure fluctuates. The liner inverts, then it may stall out meaning the liner is not inverting or moving through the pipe, more pressure is applied and suddenly the liner may begin inverting at an undesirable rate. Such an undesirable rate can cause the liner to invert but not be fully inflated so to allow the liner to press against the pipe wall as it inverts through the pipe ensuring any water in the pipe is not trapped between the pipe and the liner but is pushed out of the pipe by the inverting the liner tube.

SUMMARY

One aspect of the present disclosure includes a cured-in-place pipe rehabilitation device launcher, where the device includes a pressure vessel having an outlet at a first end and an adapter plate at a second end, and a liner assist module removably disposed on the pressure vessel. The liner assist module includes a base for attaching to the pressure vessel to the adapter plate, a frame attached above the base, a first roller rotationally attached to the frame adjacent to the base and defining an insertion plane, a second roller parallel with the first roller and offset from insertion plane, a third roller parallel with the first and second rollers and offset from the insertion plane on the opposite side of insertion plane as the second roller, and a pair of rollers parallel with the first roller and farther away from the first roller than the second roller and the third roller. The pair of rollers is located on either side of the insertion plane.

Another aspect of the present disclosure includes a cured-in-place pipe rehabilitation device launcher having a pressure vessel and a liner assist module, the pressure vessel includes an out let end, an air feed chamber above the outlet end to pressurize a cured-in-place liner to aid in urging it into a pipe to be rehabilitated, and an attachment plate is disposed above the pressure vessel. The liner assist module includes a module base plate to attach to the attachment plate, a liner assist frame coupled to the module base plate, a plurality of rollers rotationally attached to the liner assist frame, and a motor operably attached to at least one of the plurality of rollers and configured to aid in urging the cured-in-place liner into the pipe.

These and other aspects, objects, and features of the present disclosure will be understood and appreciated by those skilled in the art upon studying the following specification, claims, and appended drawings.

DETAILED DESCRIPTION

For purposes of description herein, it is to be understood that the disclosure may assume various alternative orientations, except where expressly specified to the contrary. It is also to be understood that the specific devices and processes illustrated in the attached drawings, and described in the following specification are simply exemplary embodiments of the inventive concepts defined in the appended claims.

Hence, specific dimensions and other physical characteristics relating to the embodiments disclosed herein are not to be considered as limiting, unless the claims expressly state otherwise.

In the preferred embodiment, the liner 60 is wrapped to form a tubular structure that seats against the main sewer pipe in need of repair. A tube may be formed by welding opposite edges of the liner 60 using heat or a solvent to bond the edges together. A tube may also be formed by stitching or other means of connecting the edges of the liner 60 together. A liner may also be formed by simply wrapping a flat sheet to form a tube with the opposite edges overlapping.

The liner 60 may be made from a non-resin absorbent material, which resists compression so that the wall thickness does not thin an appreciable amount under high pressure. The liner 60 is preferably made from a sheet of thermoplastic material impervious to water and other liquids. The preferred material is thermal polyurethane (TPU) or polyvinyl chloride (PVC). Other non-resin absorbent materials may be used, such as thermoset plastics, as well as other types of flexible semi-rigid or rigid plastics and fiberglass.

Figure 1:
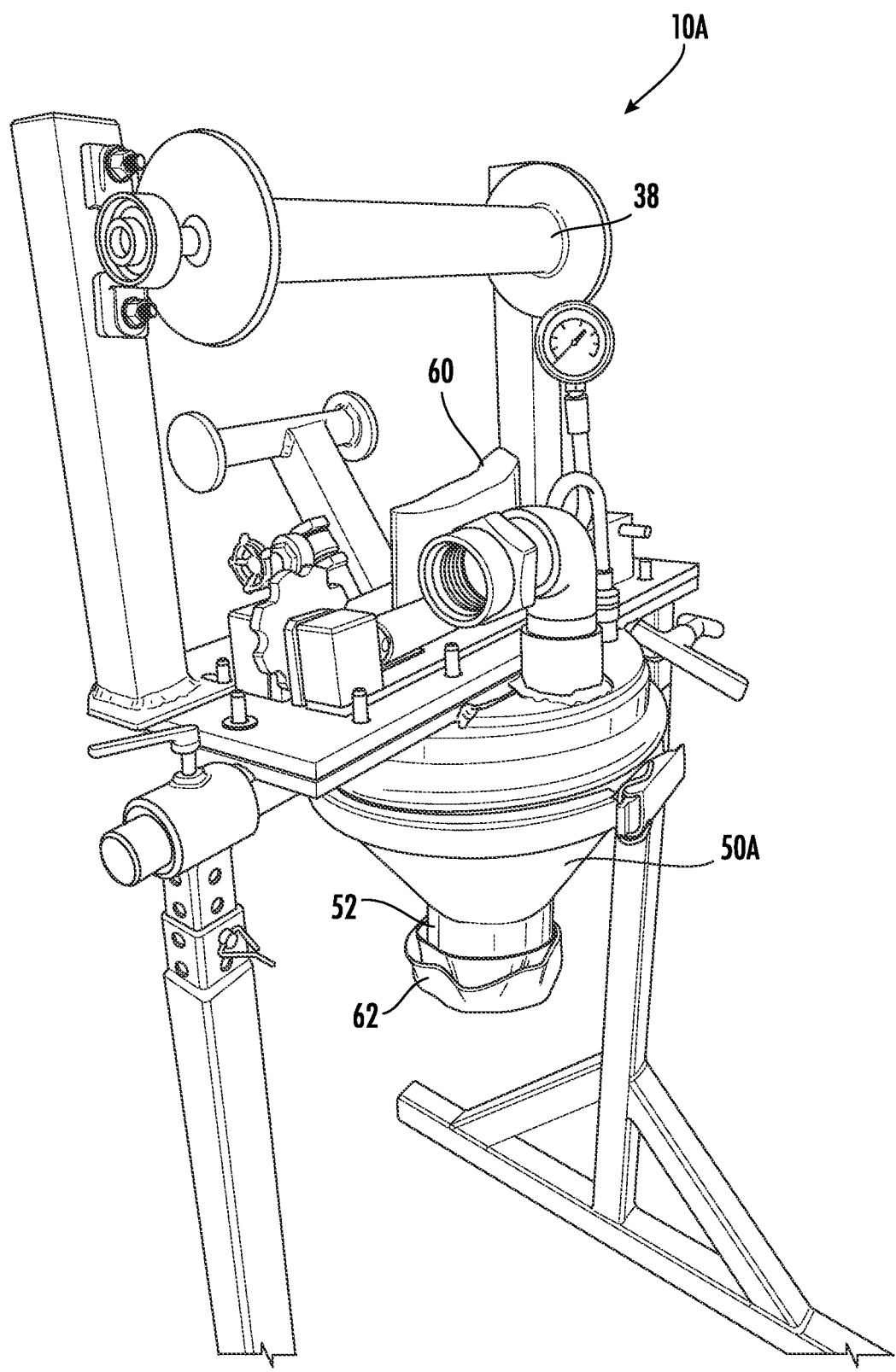
FIG. 1 is a perspective view of a typical liner launcher device.

As shown in FIG. 1, typical cured-in-place pipe (CIPP) rehabilitation devices include a launcher and an apparatus 10A to ensure the liner 60 goes into the launcher in line with the launcher entrance. The liner 60 is fed about a roller 38 solely to aid the liner 60 entering the launcher substantially vertically, in order to minimize the stress on the liner 60 during inflation and to minimize friction between the liner 60 and any elements of the launcher it may come into contact with on its way into the launcher.

The liner 60 typically has a first end 62 secured to a launcher pressure vessel 50A, typically on the outside of the outlet end 52 of the pressure vessel 50A. The force necessary to pull or push the liner 60 into and through the launcher is typically fully provided by the air pressure within the pressure vessel 50A. The pressure provided to the vessel 50A creates a force acting between the rigid walls of the pressure vessel 50A and the flexible walls of the liner 60, and urges the liner 60 out of the launcher pressure vessel 50A while the first end 62 of the liner 60 remains secured to the pressure vessel. In this way, the liner 60 is "inflated" (also referred to as "inverted", or "everted" because the liner begins inverted and is everted as it is inflated into the pipe) into the pipe that is being rehabilitated.

Figure 2:
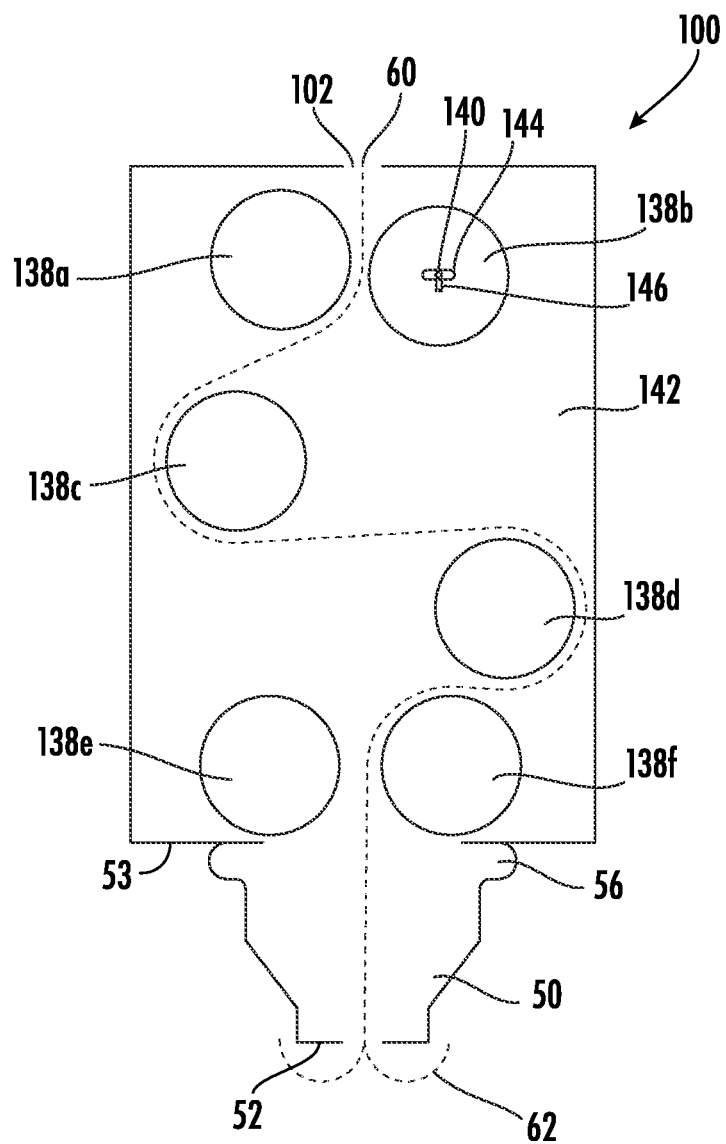
FIG. 2 is a schematic drawing of a launcher device with an embodiment of a liner assist module.

As shown in FIG. 2, a liner assist module or apparatus 100 may be attached above the pressure vessel 50. The liner assist module 100 may include a module base plate 53 for combining the pressure vessel 50 to the liner assist module 100. FIG. 2 is a schematic of one embodiment and the roller size and locations may not be to scale in practice. The liner assist module 100 may include a number of rollers 138, some powered and some idle. The powered rollers may be powered by a motor 70 that is attached to a frame 142 of the module 100. In the embodiment of FIGS. 2, 7, 8, and 10, the liner 60 may be fed into a pair of rollers 138a, 138b that are parallel to one another near the top of the module 100. Either one or both of these rollers 138a and 138b may be powered to pull the liner 60 into the liner assist module 100. The full extent of the liner 60 may be folded on itself in the back of a truck or other vehicle that carries the apparatus and the liner 60 to the job site.

The liner 60 may be inserted into a slot 102 in the top of the liner assist module 100. The slot can be made out of any type of material that will seal or semi seal against the liner. This sealing area 102 may be a top gasket. The top gasket 102 can protrude down with any type of material to make the slot area longer for more sealing area. The sealing area 102 can be a separate head that is placed on top of the liner assist. The slot area 102 can have a reinforcement to keep the gasket from pinching the liner 60. The reinforcement may be made of anything that is stiff or rigid such as but not limited to metal, aluminum, brass, or rigid fiberglass. There can also be two bent pieces of metal that extend down to hold the gasket in place so it does not come up when unit is pressurized.

The gasket that makes the seal where the liner 60 enters the chamber of the liner assist module 100 may be made so that the slot 102 is custom made smaller than the lay flat thickness of the liner tube. The gasket can have a piece of thin membrane attached to the slot to extend the slot down ¼-6" to make a seal on the liner 60 for a transition to another size or to accommodate the recirculation hose that may be connected to the end of the liner 60.

The rollers 138a and 138b are substantially parallel and may be adjusted to be spaced apart at the thickness or slightly less than the thickness of the liner 60. "Substantially parallel" in this respect means that any differences in the space between the rollers are small enough to maintain contact across the entirety of the width of the liner 60. This ensures that both rollers maintain contact across the entire width of the liner 60 as it is fed into the liner assist module 100. With at least one of the rollers 138a and 138b powered by a motor 70, the pressure vessel 50 is not needed to provide all of the work necessary to pull or push the liner 60 into the pipe to be rehabilitated. The rollers 138 that are powered provide some of the energy necessary to pull the liner from is storage as well as aid in pushing the liner into the pipe to be rehabilitated.

Figure 3:
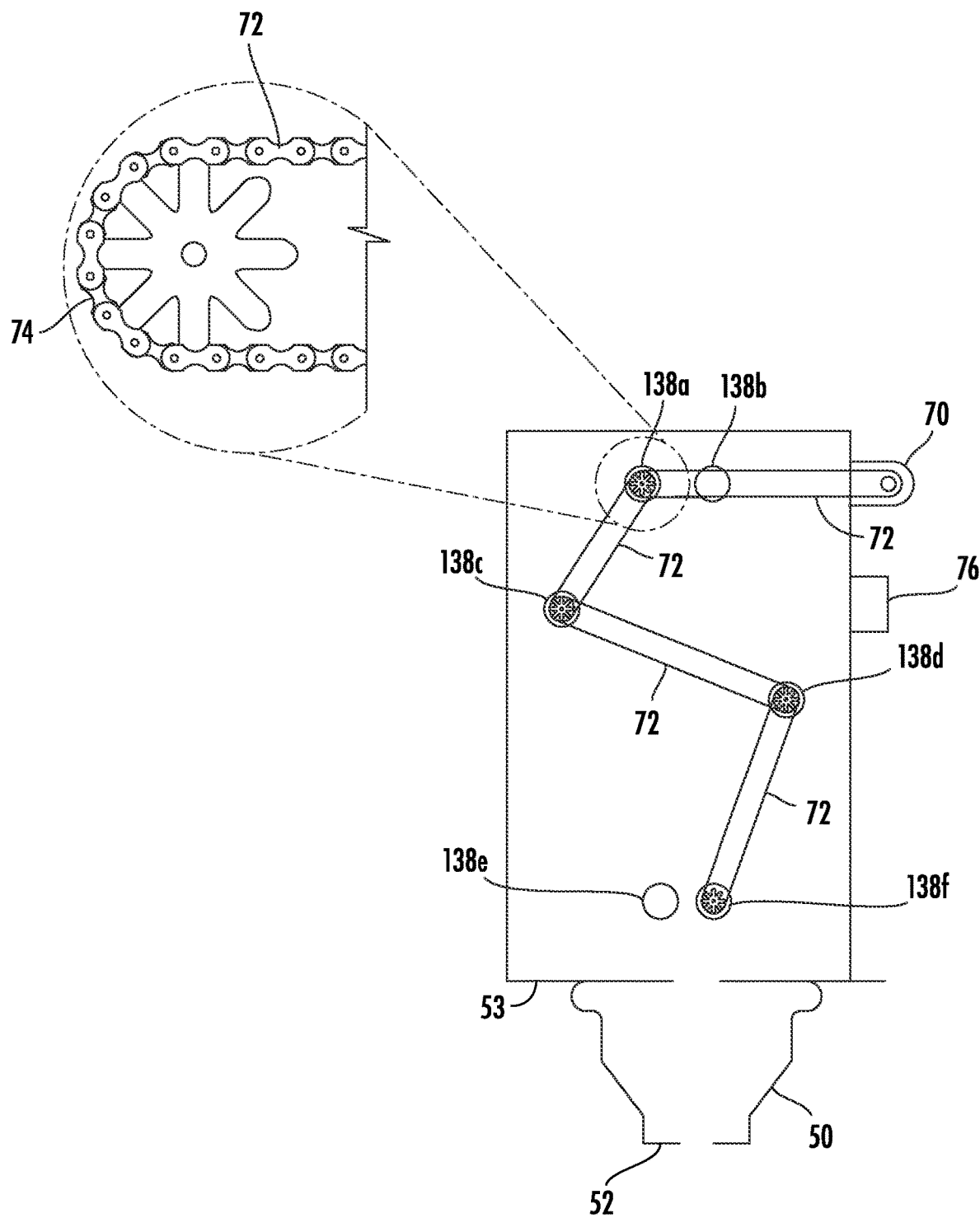
FIG. 3 is a schematic drawing of a launcher device with another embodiment of a liner assist module with a motor and encoder.
Figure 9:
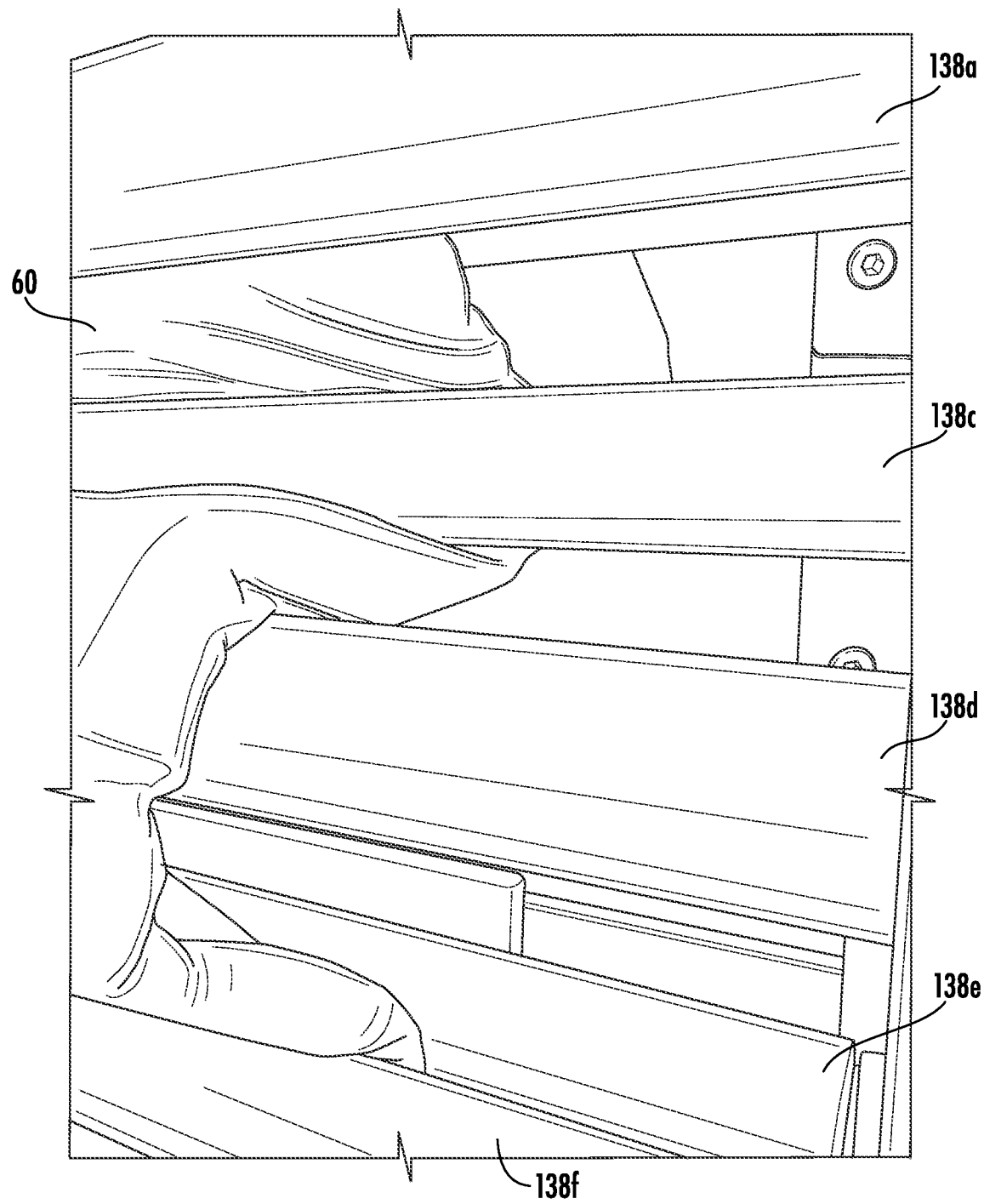
FIG. 9 is another isometric detailed view of a liner that is fed through an embodiment of the liner assist module.
Figure 10:
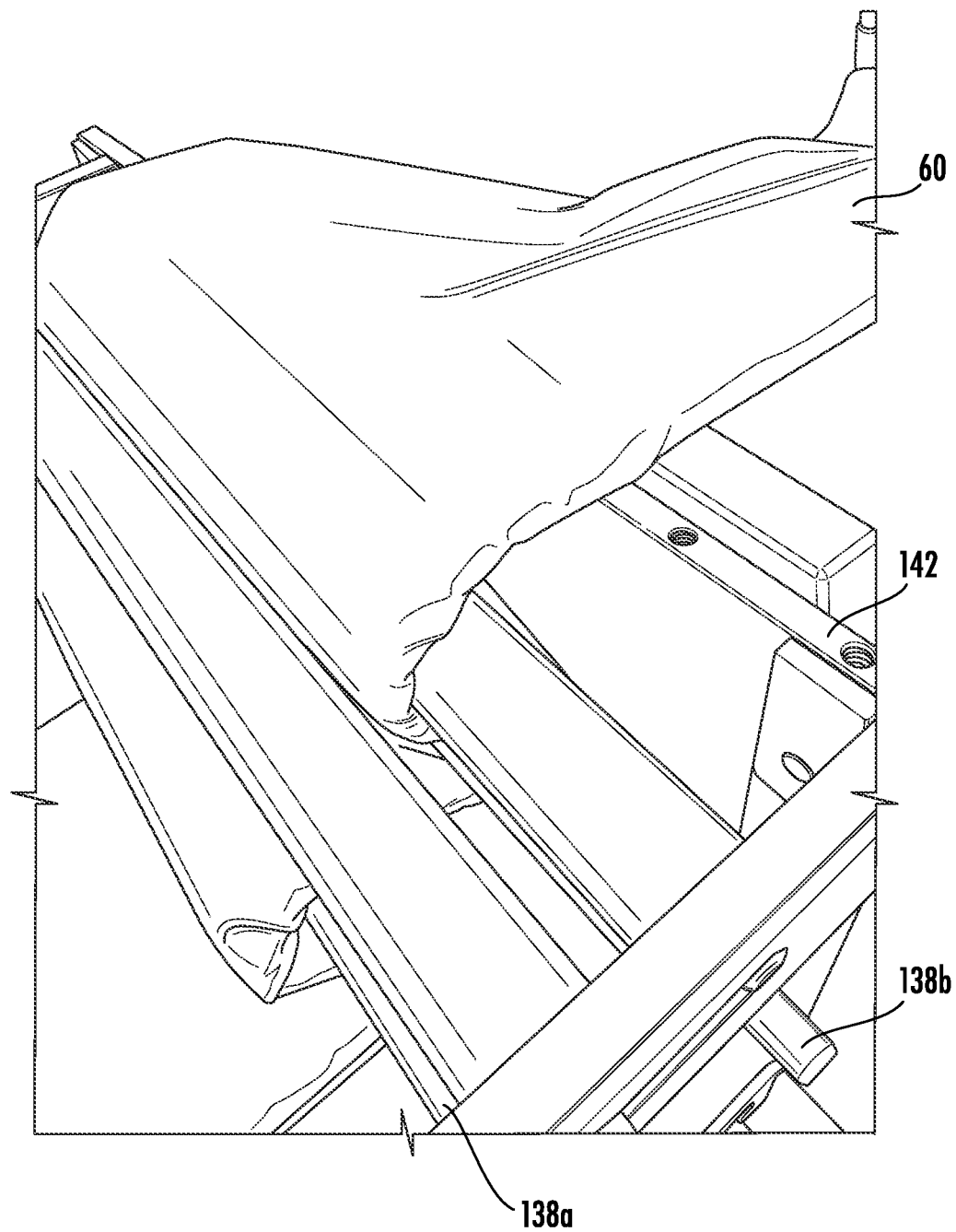
FIG. 10 is another isometric detailed view of a liner that is fed through an embodiment of the liner assist module.

Preferably, at least roller 138a is powered in the embodiment of FIGS. 2 and 9. Roller 138a as shown contacts more of the liner 60 at any given time, and the because the risk of slippage decreases as surface area contact increases, it may be preferable to power the roller that has more contact surface area. Additionally, rollers 138c, 138d, and 138f may also be powered. As shown in FIG. 3, to prevent these rollers from rotating at different speeds and causing the liner to bind within the liner assist module 100, they may be powered individually each by a single, separate motor 70, or may all be powered by a single motor 70 and connected through a series of belts or chains 72. Preferably, the motor 70 is a 110V electric motor. The chain could be gears that mesh together as well. In other embodiments the power may be provided by 12 VDC, 24 VDC, 110V, 220V, or 440V motors, or by air or hydraulic motors.

Preferably, there is a single motor 70 with a sprocket 74 and a chain 72. The chain is operably coupled to a sprocket 74 on one powered roller 138 (e.g. roller 138a). That sprocket 74 may be operably coupled to another sprocket 74 on another roller (e.g. roller 138c), through another chain 72. By coupling the powered rollers 138 to one another through a chain 72 and sprocket 74, this ensures that the rollers spin at the exact same rotational speed and prevent the liner 60 from getting bound within the liner assist module 100. In other embodiments, a chain 72 may reach directly from the motor to each powered roller 138 to ensure all powered rollers spin at the same rate. In still other embodiments, belts may be used in place of chains and sprockets.

The motor 70 may be electrically coupled to an encoder 76. The encoder 76 is shown in FIG. 3 as attached to the side wall of the module 100, but may be located in any location convenient for the user. The encoder takes information from an air pressure sensor (not shown) within the pressure vessel 50, and when the air pressure within the pressure vessel 50 reaches a predetermined value, will start the motor 70 and the powered rollers 138. The encoder may further adjust the speed of the powered rollers 138 based on the air pressure readings of the pressure sensor within the pressure vessel 50. For instance, if the air pressure increases within the pressure vessel 50, the motor may urge the rollers faster to relieve the pressure necessary to evert the liner 60 within the pipe being rehabilitated.

The encoder 76 may further be electrically coupled to a pressure or force sensor (not shown) on at least one of the top rollers 138*a* and 138*b*. As shown in FIG. 2, the encoder is on roller 138*b*, but it should be known that the sensor could be attached to either or both rollers 138*a* and 138*b*. If the pressure or force on the sensor on the top roller 138*b* is above or below a predetermined threshold, the encoder may send a signal to a locator 146 on the roller to increase or decrease the distance between the two rollers. The locator 146 may slide the axle 140 of the roller 138*b* within a slot 144 in the side wall of the module 100. Of course, the sensor and locator as shown is on a single side of the module 100, but it should be known that both sides may require the sensor and locator. In this way, the proper pressure may be applied to the liner 60 by the top rollers 138*a* and 138*b* as the liner 60 is fed into the module 100 to ensure that the rollers 138*a* and 138*b* are maintaining good contact with the liner 60 without squeezing the liner 60.

In another embodiment, the encoder may be in communicative connection with a computer located remotely from the rehabilitation site. This connection may be through a wired or wireless connection to the Internet. The computer may store and analyze the information such that subsequent rehabilitations may rely on the information from previous rehabilitations and adjust initial pressures and speeds to what has been shown to be the most efficient in similar environments and pipe sizes and materials. The encoder of the liner assist may record the footage, speed of installation, pressure of install, also the constant pressure to prove that it was never deflated. It may also record the temperature of the curing of the liner.

Additionally, once enough information is gathered, the unit may include a barcode scanner with information encoded within a barcode (such as a Quick Response code [or QR code]) that is affixed to the liner in a place that may be easily read by the operator. In this way, the initial pressures, cure times and temperatures, and speeds may be set automatically by a connection between the scanner and the encoder that has been shown to be the most efficient given past performance.

Figure 4:
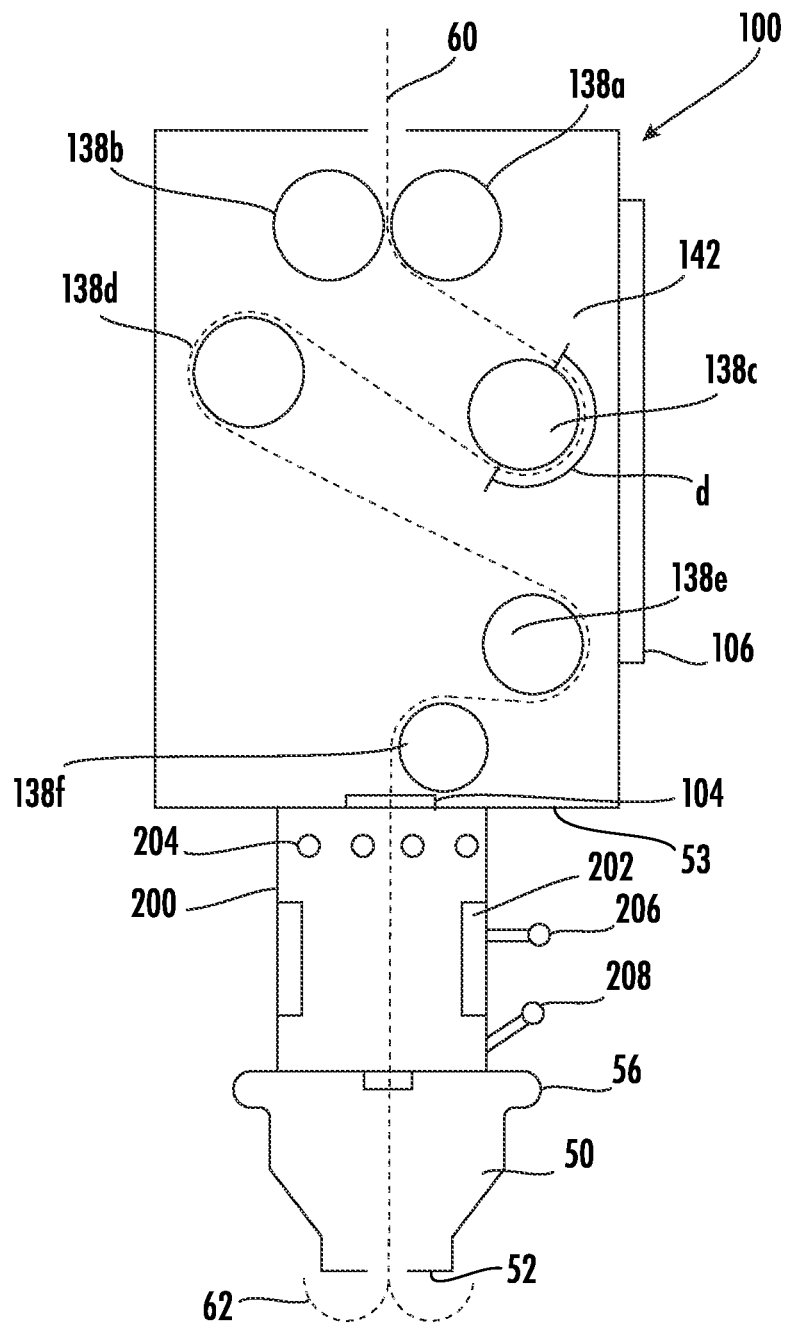
FIG. 4 is a schematic drawing of a launcher device with another embodiment of a liner assist module with an optional air feed chamber.

Referring to FIG. 4, another schematic view of a launcher device is shown with an optional air feed chamber 200. In this embodiment, the rollers 138 of the liner assist module 100 are situated vertically such that the liner 60 contacts more of each roller 138 to minimize slippage between the liner 60 and the rollers 138. By moving roller 138*c* slightly downward and roller 138*d* slightly upward, the liner 60 must contact more of each of the rollers 138 (as shown by the dimension d on roller 138*c*) as it is fed into and through the liner assist module 100, which increases to surface area contact between the liner 60 and the rollers 138 to minimize slippage. There may be an openable door 106 situated on a user-facing side of the liner assist module 100. The door 106 may be used to allow the user to feed the liner through the rollers 138 initially, as well as fix any binds that may happen during use. The door 106 may be sealed.

Like shown previously, one or more of the rollers in the embodiment of FIG. 4 may be powered. The energy provided to the rollers in FIG. 4 works in the same way as shown in the embodiment of FIGS. 2-3.

Between the liner assist module 100 and the pressure vessel 50, there may be an air feed chamber 200. The air feed chamber 200 may include an optional bladder 202. The air feed chamber 200 may include an air feed 208 that provides the air pressure to inflate the liner 60 and evert the liner into the pipe to be rehabilitated. The air feed 208 may also be used as a discharge when steam is hooked up to the system, as described further below. The air feed chamber may include oilers 204. The oilers 204 lubricate the liner 60 as it is shot into the rehabilitated pipe.

A bladder inflation connection 206 may also be attached to the air feed chamber 200 specifically to inflate the bladder 202 if a bladder 202 is used. In the case when a bladder 202 is used, the liner 60 is shot into the pipe, then the bladder is inflated to provide the outward pressure to set and cure the rehabilitation material within the liner 60 to the pipe walls. However, a bladder 202 may not be necessary in a manhole-to-manhole type repair. The bladder 202 may be shot at the same time as the liner 60, or the liner 60 and the bladder 202 may be shot separately in series.

The liner assist module 100, the air feed chamber 200, and the pressure vessel 50 may all be connected to one another through quick connects as is known in the art.

Figure 5:
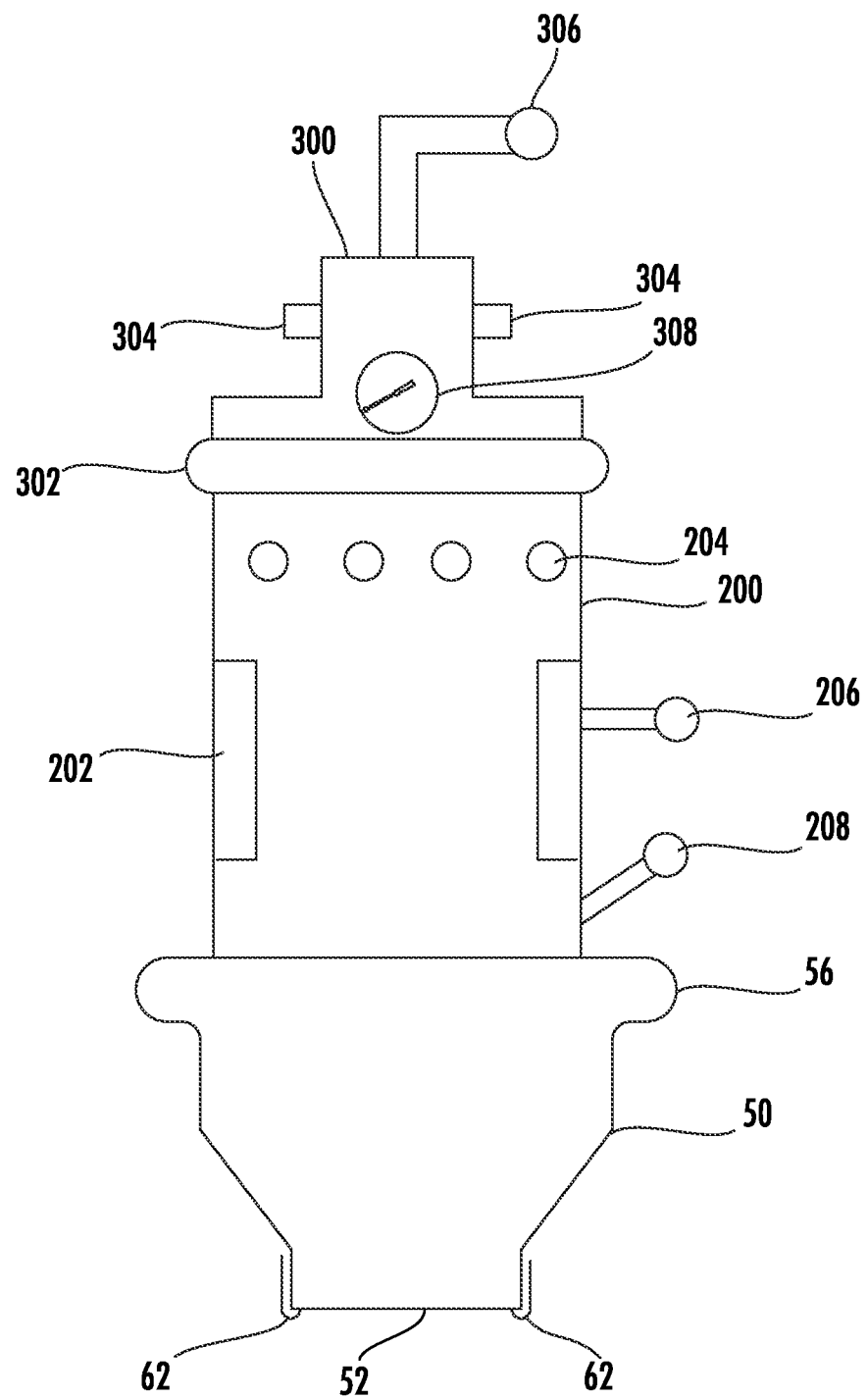
FIG. 5 is a schematic drawing of an embodiment of the launcher device with the liner assist module removed and a steam chamber attached.

The launcher device 10 may include a base structure 400. The base structure 400 may have horizontal rails 402 and wheels 404 that allow the launcher device to be moved easily into position. The rails 402 allow the liner assist module to be rolled away from the air feed chamber 200 and the pressure vessel 50. The liner assist module 100 may include wheels 412 that ride within the rails 402 to allow easy removal of the liner assist module from the air feed chamber 200. Once the liner assist module 100 is rolled away, a steam chamber 300 may be attached to the air feed chamber 200 via the quick connects. The steam chamber 300 (shown combined with the pressure vessel 50 in FIG. 5) generates steam to inflate the bladder 202 in the case where a bladder is used. The steam helps to pressurize the bladder 202, while the heat from the steam aids in the curing of the material within the liner 60 that is repairing the pipe.

The process of the launcher device consists of a variable number of rollers 138 that can be either powered or idler pulleys. The rollers 138 are placed in series and offset from one another such that the liner 60 is weaved through them to maximize the contact that each roller 138 has with the liner 60. The rollers 138 can be smooth, belted or have varying material made on them or placed over them to give the most grip on the liner 60. In one embodiment, the liner is placed and folded upon itself within a truck or trailer. A conveyor belt that spins and traverses up and down the length of a truck or trailer may be used to dispense the liner 60 into the launcher device 10. The liner 60 is placed on the belt and is fan folded on to the bed of the truck or trailer.

The placement of two rollers 138*a* and 138*b* that are both powered, one powered or both not powered that are completely adjustable to the appropriate thickness of the liner can be part of the roller system. The adjustment may be a mechanical adjustment or the rollers may be adjusted electrically, either by a user adjustment or automatically by an encoder reading pressure readings from the rollers and adjusting the separation of the rollers 138*a* and 138*b*. The contact between the liner 60 and the powered rollers is such that enables the liner 60 to be controlled during insertion process. Controlling the speed at which the liner 60 everts and the reduction in air pressure or water pressure during the installation process will produce a consistent thickness, less resin loss and a better installation process. The rollers 138 are placed in an S configuration. In an embodiment, the rollers 138 may be covered in belting material that grips the coating on the liner but does not damage it.

At least one of the rollers 138 may have a switch that it activates by the roller pulling down. This action is a direct result of applying air pressure to the unit. When air pressure is applied to the pressure vessel 50 the liner 60 naturally wants to evert into the pipe, therefore pulling down on the roller 138 that the liner 60 is resting on. A switch 76 (see FIG. 3) coupled to at least one of the rollers 138 may sense that the liner 60 is being pulled, and activate the at least one powered roller to begin aiding the pressure vessel in everting the liner 60 into the pipe being repaired. This action could be operated by a pressure sensor, or any action caused by applying pressure to the system or any roller in the system. When the sensor senses that the liner is being pulled, it activates the switch which turns on the motor, in turn activating the powered rollers 138. When the motor 70 (system) is engaged the liner 60 is pulled into the chamber therefore allowing the liner 60 to invert or move forward.

In another embodiment, the liner assist rollers 138 have one end that has a free spinning roller on the roller itself. This allows for a rope to be strung through the liner assist module 100 without getting wrapped around the rollers 138. The rope is attached to the end of the liner 60 that is the last part to enter the liner assist module 100. The other end of the rope is attached to a heat transfer hose 64 (or a lay flat hose) that trails up the liner 60 as it passes down the pipe to the termination point. This lay flat hose 64 follows the liner 60 into the pipe being repaired and after the liner 60 is in place, and provides heat, typically in the form of steam, to help the material within the liner 60 cure to the inner walls of the pipe being repaired.

The lay flat hose 64 may be stored on a reel (not shown) on a truck or otherwise placed in a position near the pipe. As the lay flat hose 64 is pulled into the pipe by being attached to the end of the liner 60, it is pulled off the reel. In the embodiment with a bladder, once the liner is fully installed the bladder 202 is inflated to seal off the air from leaking out between the pipe walls and the liner 60. The bladder 202 is kept under a regulated pressure which is controlled by a valve 208. The bladder is inflated by a regulator 206. The lay flat hose 64 is then cut and a fitting (cam lock or any quick type securing mechanism) is inserted into the lay flat hose 64. The hose 64 is secured by any number of clamps such as hose clamps, band it clamps, or a special made clamp that ensures the lay flat 64 is secured and cannot come off. Once the fitting is secured, it is attached to its male or female counter part inside the steam feed chamber 300. The steam feed 300 has a hose connected to it from the heat source.

Figure 11:
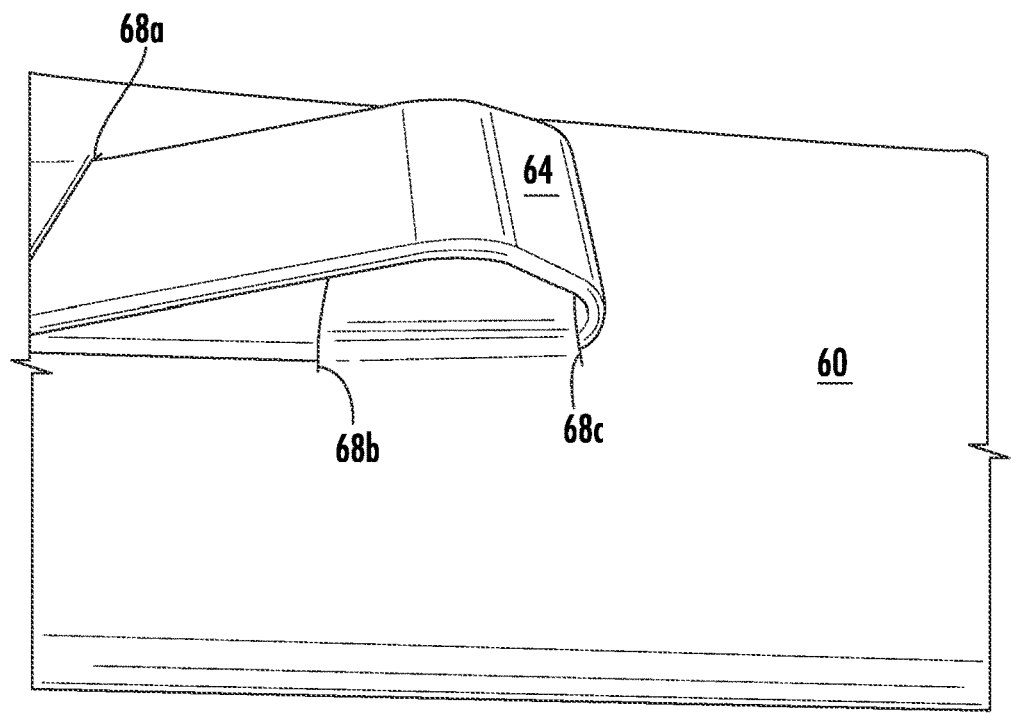
FIG. 11 is an isometric view of the liner of an embodiment with the lay flat hose threaded through the liner.
Figure 12:
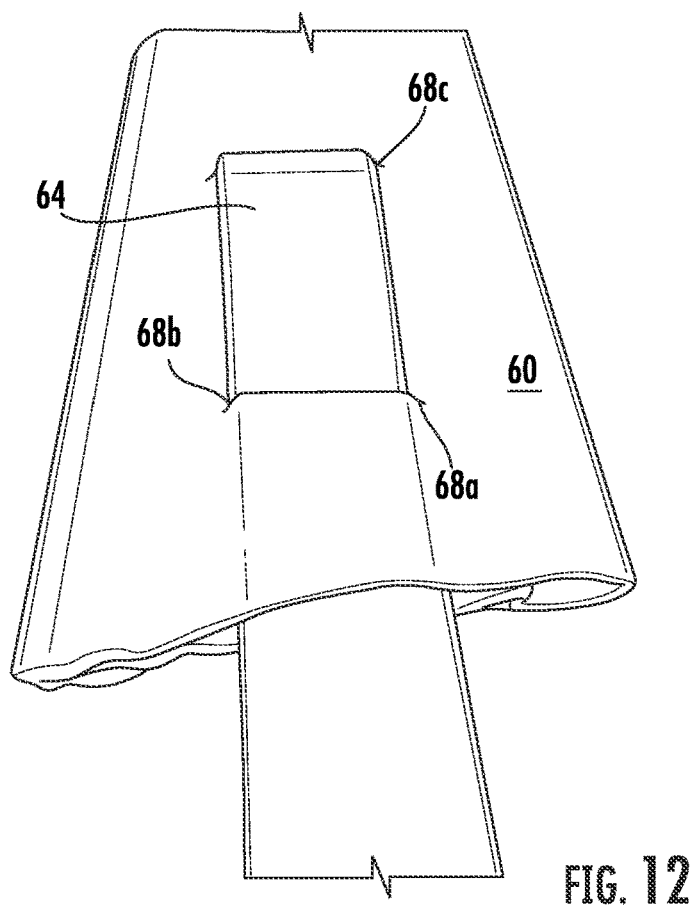
FIG. 12 is another isometric view of the liner of an embodiment with the lay flat hose threaded through the liner.

The lay flat steam hose connection to the liner 60 can be done numerous ways. The preferred way is to separate the layer of uncoated felt from the layer of coated felt within the liner 60. Typically, the outside layer of the liner 60 is coated, and the inside layer of the liner 60 is non-coated. The coated layer is peeled back about 2' (everted) and then 3 slices 68 are put through the entire uncoated layer about 3"-6" apart as shown in FIGS. 11 and 12. The 2" lay flat hose 64 is inserted up through the first cut 68*a*, then down through the second cut 68*b*, then up through the third cut 68*c*. The lay flat hose 64 is then pulled through all three and folded back on itself and attached together back behind the end of the liner 60. The lay flat hose 64 may be attached with hog rings (not shown) as may be known in the art. This is a simple way to connect lay flat together. This can be done with rope by punching holes in the lay flat 64 and weaving it in and out of the lay flat. This method for connecting the lay flat hose to the liner is unique because it affords a smooth transition from the liner 60 to the lay flat 64. The recirculation lay flat hose 64 can be made of a variety of materials, as long as it is able to take 270° F. degrees of heat. It can be sewn or welded together or made into a tube. It needs to be perforated to allow the steam to blow out of small holes stir up any condensate water that may lay in the bottom of the pipe being rehabilitated.

The lay flat hose 64 is where the heat is sent through laying on the bottom of the liner 60. The bottom of the liner 60 is where condensate may collect from the steam and from the liner 60 being refrigerated then heated to 220 degrees or more. The holes (not shown) within the hose 64 causes the condensation to be stirred up allowing the heat to get the liner 60 hot enough to cross link and cure the liner 60. In all previous methods a hose is not used and the condensation collects and steam goes over the condensation causing the liner 60 itself not to cure. The hose 64 may also remove the need for an operator at the end of the liner, because the steam escapes at the end of the hose and returned back down the entire pipeline to be exhausted where it was injected into. This allows the operator of the curing truck to controls both the feed and the exhaust of the steam which may eliminate the need for an operator at the other end.

The lay flat 64 may be a single tube or may be comprised of many parts. In the case where it is many parts, the individual parts of the lay flat 64 needs to be able to be connected with other small pieces of lay flat in order to eliminate waste and reuse the lay flat 64. This is done by inserting the lay flat that is coming off the reel into the lay flat that is being fed into the shooter in the direction of the steam. If it were connected the opposite way it would not flow properly into the next piece of lay flat. The individual pieces of the lay flat 64 are then hog ringed, tied or welded together.

The use of a lay flat hose process allows the heat to be sent from the steam chamber 300 through the lay flat which in turn heats the bottom of the pipe up because it is laying on the bottom of the pipe. The bottom of the pipe is typically cooler because heat rises. Lifts of the liner off of the bottom of the pipe may occur because of this. A lift is a liner that is not cured and the water gets under it and causes it to lift up. The perforations in the lay flat hose also stir up the condensation that gets into the pipe from the liner being so cold then getting heated up. This also may cause lifts because the water pools up and the steam passes over it therefore causing a lift.

The recirculation hose 64 also makes the steam go to the end of the liner 60, where it is then released within the liner 60 and sent back through the entire pipe to the same end that is connected to the steam chamber 300 where the steam was introduced. This eliminates the need for a person regulating the release of steam at the opposite end of the liner 60. With the recirculation system all the controls are done by the same user that introduces the steam, eliminating a person necessary for the entire operation.

Other benefits of the system include eliminating the possibilities of the liner opening up because the liner is not deflated. This also eliminates the possibility of the host pipe collapsing on the liner should the pipe break upon the installation. It also eliminates the possibility of trapping water which happens when the liner is deflated anytime during installation.

In operation the first thing that must be done is to install a rope from the liner slot through the idle rollers where the rope is secured and ready to be attached to the lay flat hose and the tail end of the liner 60. The rope may be strung from the liner slot through the liner assist rollers 138 down through the air feed chamber 200 then through the pressure vessel 50. The liner 60 may be tied onto the rope and inserted into the liner slot 102. The gap setting on the top two feed rollers 138*a*, 138*b* are set to the proper thickness of the liner 60. The liner 60 is then fed through the roller system. The user may control the speed of the feed using a foot pedal electrically connected to the motor to operate the rollers and a given speed and/or direction. In another embodiment, the sensor may be used to automatically update the speed of the motor and subsequently, the speed of the rollers. As the liner pulls down harder on the rollers, the sensor senses the increased pressure and increases the speed of the motor to adjust. Alternatively, as pressure is relieved from the roller, the sensor may send a signal to the motor to slow down, allowing the liner to "catch back up."

Then the liner is pulled through the air feed chamber 200 and attached to the outside of the pressure vessel 50 with a band, clamp or strapping. The pressure vessel 50 and/or the air feed chamber 200 is then pressurized, and the liner is everted into the pipe being repaired. The switch may then be activated in to start the powered liner assist rollers 138 to start turning. The pressure going into the liner 60 is regulated by a valve 208 that allows air into the connected pieces of the inversion unit. All the chambers 50, 100, 200, 300 of the unit are connected by quick connect clamps. This allows the user to quickly connect and disconnect these units to other equipment necessary to run the launcher device 10. As the liner 60 is everted, the oilers 204 are turned on and the liner 60 is lubricated as it passes by the oilers 204. The rope that is tied off in the idle rollers is then secured to the end of the liner 60 that is sealed up. As the rope passes through the rollers, it begins to pull the other end of the rope attached to the lay flat hose. The door 104 is closed and the rollers stop turning. The lay flat hose starts feeding into the slot. Once the liner 60 has reached its termination point, the bladder 202 in the air feed chamber 200 may be inflated by a regulator 206 in the embodiment including the optional bladder.

Figure 6:
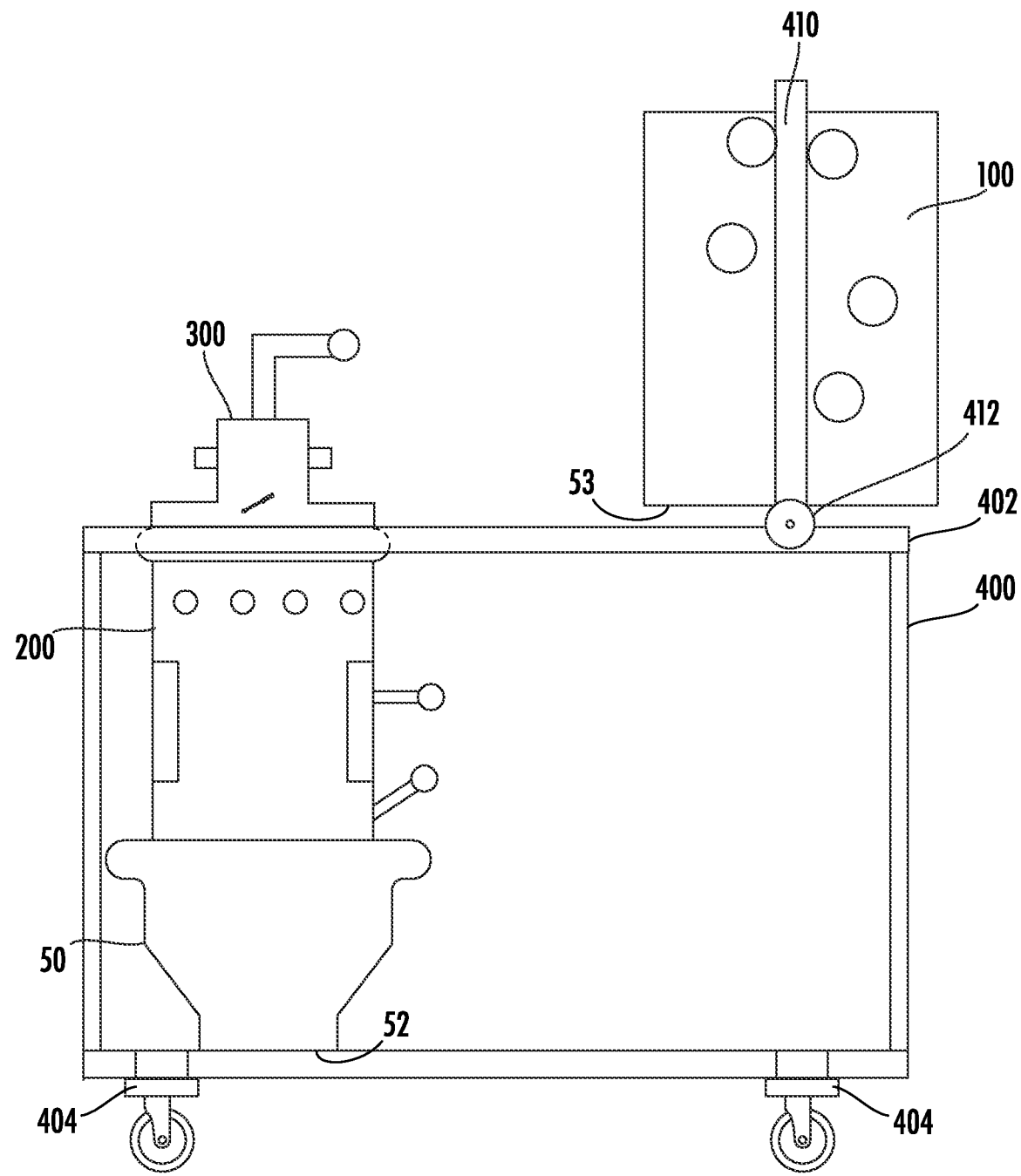
FIG. 6 is a schematic drawing of the steam chamber attached to the launcher with the liner assist module rolled out of the way.
Figure 7:
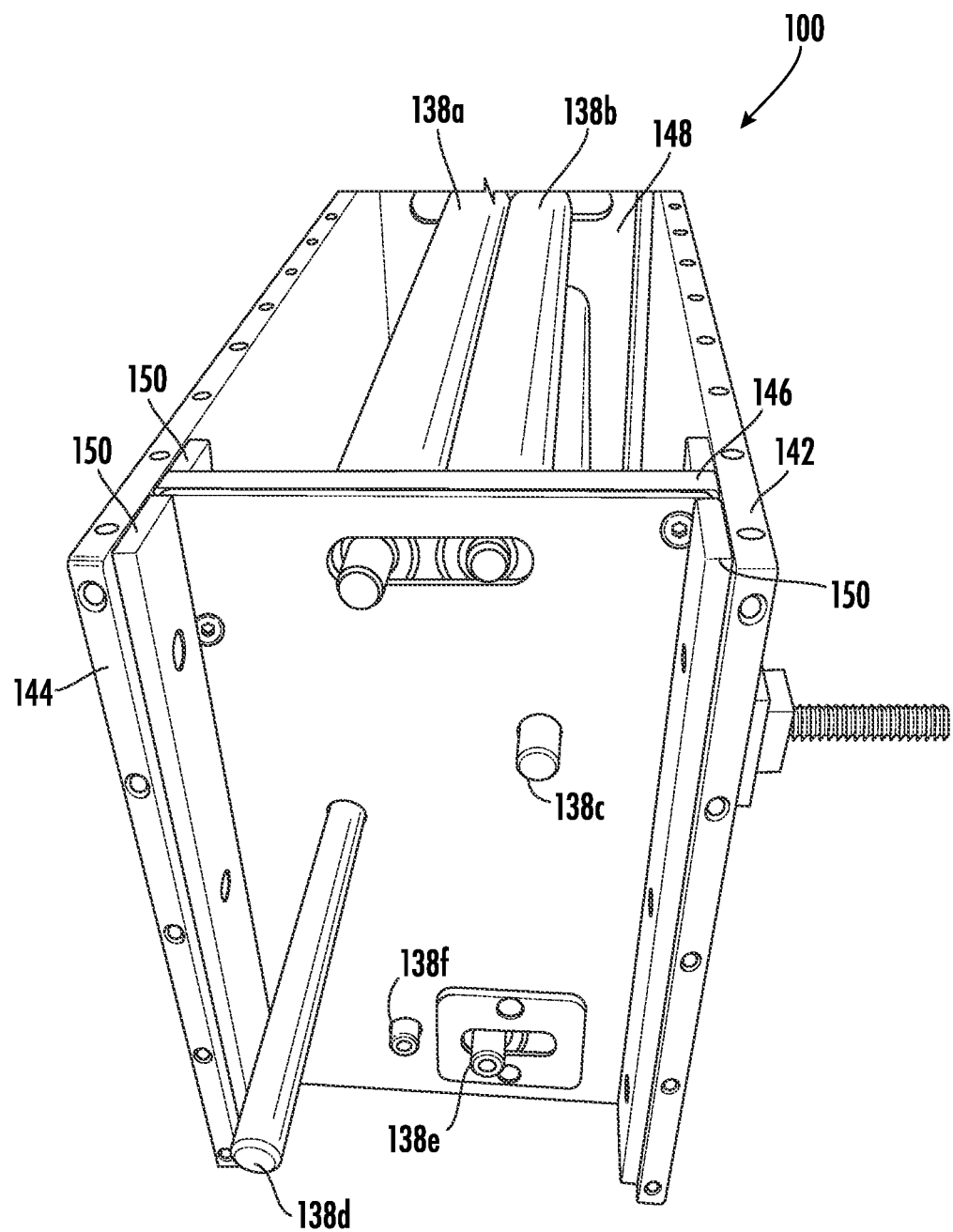
FIG. 7 is an isometric view of an embodiment of the liner assist module.
Figure 8:
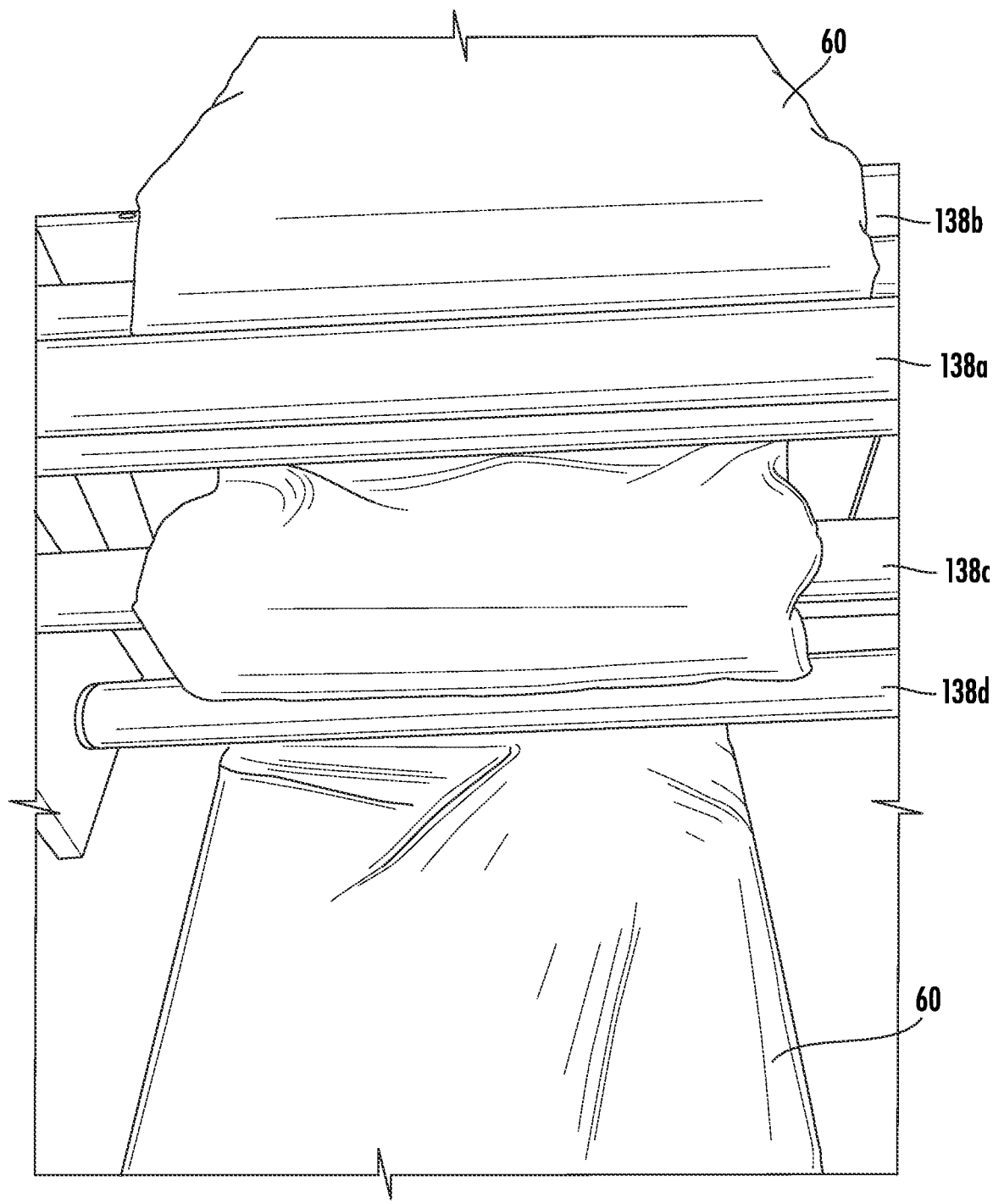
FIG. 8 is an isometric detailed view of a liner that is fed through an embodiment of the liner assist module.

The liner assist module 100 may then be disconnected to the air feed chamber 200 and rolled out of the way as shown in FIG. 6. The steam chamber 300 may then be placed on and connected to the air feed chamber 200 and connected to the free end of the lay flat hose. Steam is introduced to the lay flat hose and into the liner or bladder, depending on the option chosen. Now the steam feed is turned on and the air feed is turned into a steam discharge hose that is regulated by a gate valve. The temperature and pressure may be monitored as the liner is processed from this one unit. The air pressure is maintained on the liner 60 below the air feed chamber. The air is bled off the steam feed chamber 300.

The liner assist module is created to control the speed of the inversion (installation) of the lining process. Currently there is no system that allows for the controlled speed of the inversion. The liner assist pulls the liner into the air chamber and prevents the stretching of the liner by reducing the air pressure that is applied to the apparatus to get the liner to invert. This keeps the liner uniform in all areas of the pipe. Typical devices to install liner currently stretch the liner badly in the first 25% of the pipe. Some of the benefits to this type of system are less stress on the liner, less elongation, better uniform wall thickness, no damage to the liner due to high speed and abrupt stops. Conventional installation devices use a rope to attempt to control the installation and they may burn a hole in the liner and the liner fails to be processed properly.

As described above, control of the inversion of the liner allows for a consistent pressure to be applied to the liner as it unfolds into the pipeline that is being rehabilitated. Along with consistent pressure applied to the liner, a consistent speed of inversion is also applied which makes the finished product equal along the entirety of the pipeline. The control of the inversion made by the pulling of the unfolded tube into the sealing apparatus makes the pressure necessary to cause the liner to invert only necessary for the inverted portion of the liner; the flat non-inverted portion of the liner is not pulled through the liner by the air pressure but rather by the powered roller system. The varying friction created at the seal becomes a non-issue as the rollers provide for a consistent liner feed speed that prevents the liner tube from uncontrollably inverting at a high rate of speed.

Figure 13:
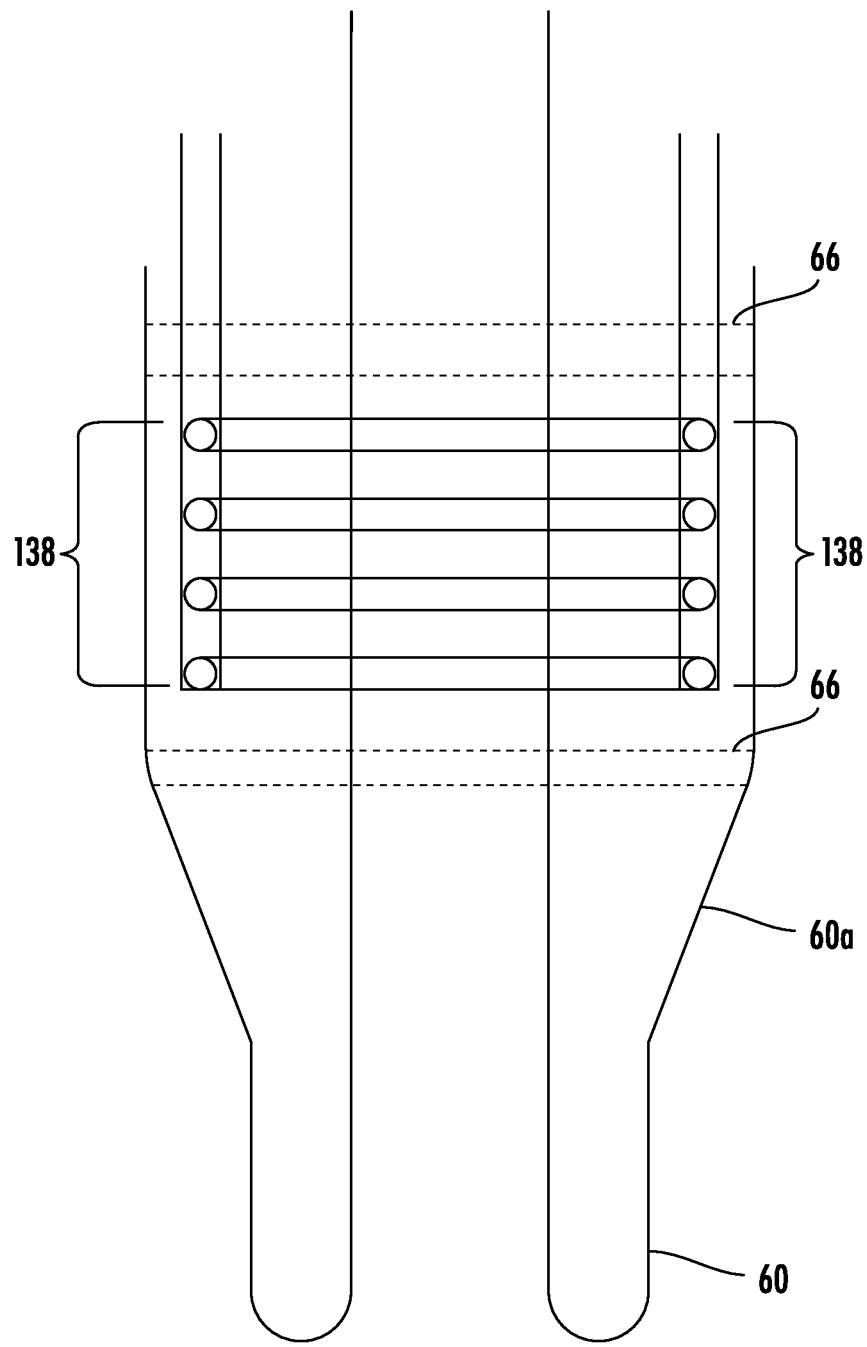
FIG. 13 is a schematic drawing of an embodiment of the liner assist module with the rollers on the inside of the pressure vessel.

In FIG. 13, another embodiment is disclosed. In this embodiment, the liner 60 is attached to the outside of the launcher, and the rollers 138 are attached within the launcher. The liner 60 includes a tapered portion 60*a* where the liner goes from a larger diameter liner down to the final diameter used within the pipe being rehabilitated. the liner 60 is then routed through the launcher and the rollers 138, and into the pipe. The basic function of the launcher and the liner assist are the same, but in this case the rollers are located within the launcher itself as opposed to an external attachment. Similar to the above, one or more of the rollers 138 within the launcher are powered to assist the pressure vessel in launching the liner 60 into the pipe being rehabilitated.

It will be understood by one having ordinary skill in the art that construction of the described disclosure and other components is not limited to any specific material. Other exemplary embodiments of the disclosure disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the disclosure as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further it is to be understood that such concepts are intended to be covered by the following claims unless these claims by their language expressly state otherwise.

What is claimed is:

1. A cured-in-place pipe rehabilitation device launcher, comprising:
   a pressure vessel having an outlet end;
   a liner assist module removably combined with the pressure vessel, the liner assist module comprising:
      a module base plate for attaching to the pressure vessel;
      a frame attached to the module base plate;
      a first roller rotationally attached to the frame adjacent to the module base plate and defining a liner insertion plane;
      a second roller extending parallel with the first roller and offset from the liner insertion plane;
      a third roller extending parallel with the first and second rollers and offset from the liner insertion plane on the opposite side of the liner insertion plane as the second roller;
      a pair of rollers extending parallel with the first roller and farther away from the first roller than the second roller and the third roller, the pair of rollers disposed on either side of the liner insertion plane.

2. The cured-in-place pipe rehabilitation device launcher of claim 1, wherein at least one of the rollers is powered.

3. The cured-in-place rehabilitation device of claim 2, further comprising a motor operably coupled to the at least one roller that is powered.

4. The cured-in-place rehabilitation device of claim 3, wherein a plurality of the rollers are powered.

5. The cured-in-place rehabilitation device of claim 4, wherein the plurality of powered rollers are operably coupled by a chain to a plurality of sprockets attached to the plurality of powered rollers.

6. The cured-in-place pipe rehabilitation device launcher of claim 1, further comprising wheels disposed on a lower portion of the liner assist module configured to roll within an upper portion of a base structure.

7. The cured-in-place rehabilitation device of claim 6, wherein the base structure further comprises wheels configured to allow a user to move the rehabilitation device easily.

8. The cured-in-place rehabilitation device of claim 1, further comprising a pressure sensor combined with at least one of the pair of rollers.

9. The cured-in-place rehabilitation device of claim 8, further comprising an encoder operably coupled to an encoder and a locator, wherein the pressure sensor is configured to adjust the location of the locator based on electrical readings from the encoder.

10. A cured-in-place pipe rehabilitation device launcher, comprising:
    a launcher assembly comprising:
       a pressure vessel having an outlet end and an air feed chamber disposed above the outlet end and configured to pressurize a cured-in-place liner to aid in urging the cured-in-place liner into a pipe to be rehabilitated;
       a liner assist module comprising:
          a module base plate configured to attach to the pressure vessel;
          a frame coupled to the base plate;
          a plurality of rollers rotationally attached to the frame;
          a motor operably attached to at least one of the plurality of rollers and configured to aid in urging the cured-in-place liner into the pipe.

11. The cured-in-place pipe rehabilitation device launcher of claim 10, further comprising an encoder electrically connected to the motor.

12. The cured-in-place pipe rehabilitation device launcher of claim 11, wherein the encoder is further electrically coupled to an air pressure sensor within the air feed chamber and configured to receive an air pressure reading from the air feed chamber.

13. The cured-in-place pipe rehabilitation device launcher of claim 12, wherein the encoder is configured to adjust the speed of the motor based on the air pressure reading from the air feed chamber.

14. The cured-in-place rehabilitation device of claim 10, wherein a plurality of the rollers are powered by the motor.

15. The cured-in-place rehabilitation device of claim 14, wherein the plurality of powered rollers are operably coupled by a chain to a plurality of sprockets disposed on the plurality of powered rollers.

16. The cured-in-place pipe rehabilitation device launcher of claim 10, wherein the liner assist module further comprises wheels disposed on a lower portion of the liner assist module and are configured to roll within an upper portion of a base structure.

17. The cured-in-place rehabilitation device of claim 10, wherein the base structure further comprises wheels configured to allow a user to move the rehabilitation device easily.

18. The cured-in-place rehabilitation device of claim 10, wherein the plurality of rollers further comprises a pair of rollers disposed near the top of the liner assist module, and configured to receive a rehabilitation liner between the pair of rollers.

19. The cured-in-place rehabilitation device of claim 18, further comprising a pressure sensor on at least one of the pair of rollers.

20. The cured-in-place rehabilitation device of claim 19, further comprising an encoder operably coupled to an encoder and a locator, wherein the pressure sensor is configured to adjust the location of the locator based on electrical readings from the encoder.

* * * * *